United States Patent [19]
Dölle et al.

[11] Patent Number: 6,160,821
[45] Date of Patent: Dec. 12, 2000

[54] SYNCHRONIZATION OF DIGITAL COMMUNICATION SYSTEMS

[75] Inventors: Thomas Dölle, Bad Mergentheim; Tino Konschak, Stuttgart, both of Germany

[73] Assignee: Sony International (Europe) GmbH, Kolin-Ossendorf, Germany

[21] Appl. No.: 09/185,022

[22] Filed: Nov. 3, 1998

[30] Foreign Application Priority Data

Nov. 5, 1997 [EP] European Pat. Off. .............. 97119351

[51] Int. Cl.$^7$ ...................................................... H04J 3/06
[52] U.S. Cl. ........................................... 370/509; 370/510
[58] Field of Search ..................................... 370/203, 208, 370/210, 326, 395, 413, 509, 510; 375/116

[56] References Cited

U.S. PATENT DOCUMENTS

| | | | |
|---|---|---|---|
| 4,649,543 | 3/1987 | Levine | 371/41 |
| 4,849,995 | 7/1989 | Takeo et al. | 375/116 |
| 5,343,498 | 8/1994 | Toy et al. | 375/37 |
| 5,557,609 | 9/1996 | Shobatake et al. | 370/60.1 |
| 5,694,389 | 12/1997 | Seki et al. | 370/208 |

OTHER PUBLICATIONS

Keller T. et al.: "Orthogonal frequency division multiplex synchronisation techniques for wireless local area networks" Proceedings of PIMRC '96 —7th International Symposium on Personal, Indoor, and Mobile Communications, Taipei, Taiwan, vol. 3, Oct. 15–18, 1996, ISBN 0–7803–3692–5, 1996, New York, NY, USA, IEEE, US, pp. 963–967, XP002063294.

*Primary Examiner*—Huy D. Vu
*Assistant Examiner*—Alexander Boakye
*Attorney, Agent, or Firm*—Frommer Lawrence & Haug, LLP.; William S. Frommer; Bruno Polito

[57] ABSTRACT

According to the present invention a system and a method for synchronising digital communication systems is proposed. Thereby a reference symbol RS consisting of a sequence of a plurality of synchronisation patterns SP and followed by data symbols, which are both modulated (13) on a RF-frequency is provided. The received reference symbol (RS) is correlated with a delayed version of itself and the correlation peak is identified giving the position and complex correlation result that can be used for the timing and frequency synchronisation of a digital communication system. According to the present invention the phase of the last and/or the first of the plurality of synchronisation patterns SP of said reference symbol RS (or a part or a multiple thereof) is phase shifted, e.g. by 180°, before the transmission step. According to the present invention therefore the effects of random contribution of adjacent data symbols of the reference symbol to a correlation calculation based on a synchronisation algorithm can be entirely eliminated. Through the inversion of the last synchronisation pattern and the reference symbol the correlation peak, which is used to determine the symbol timing, is offset inside the reference symbol. Thus, the precision of the timing error estimation is improved significantly.

9 Claims, 4 Drawing Sheets

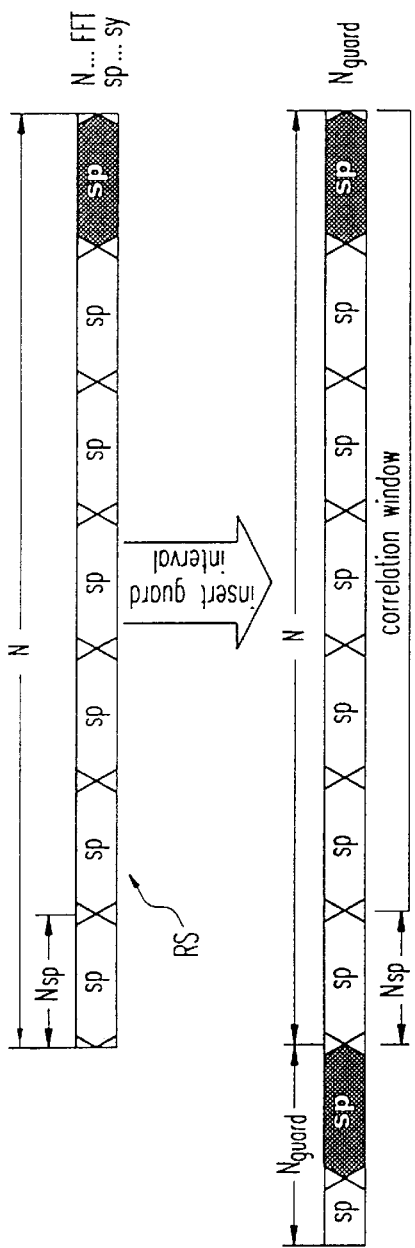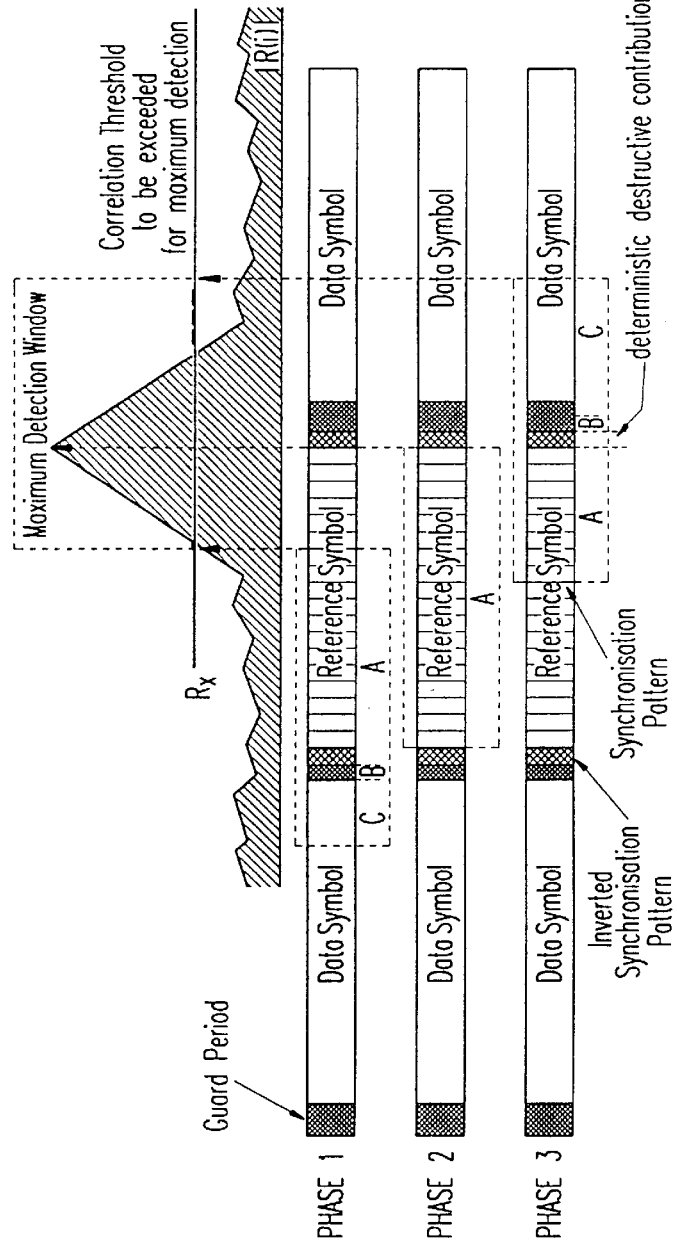

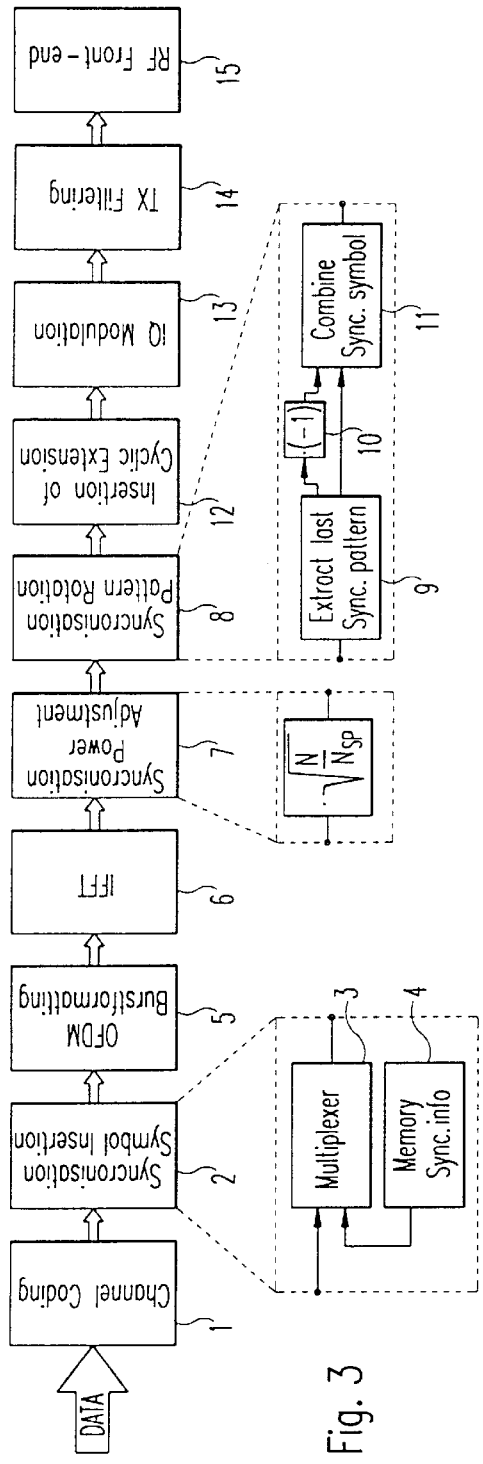
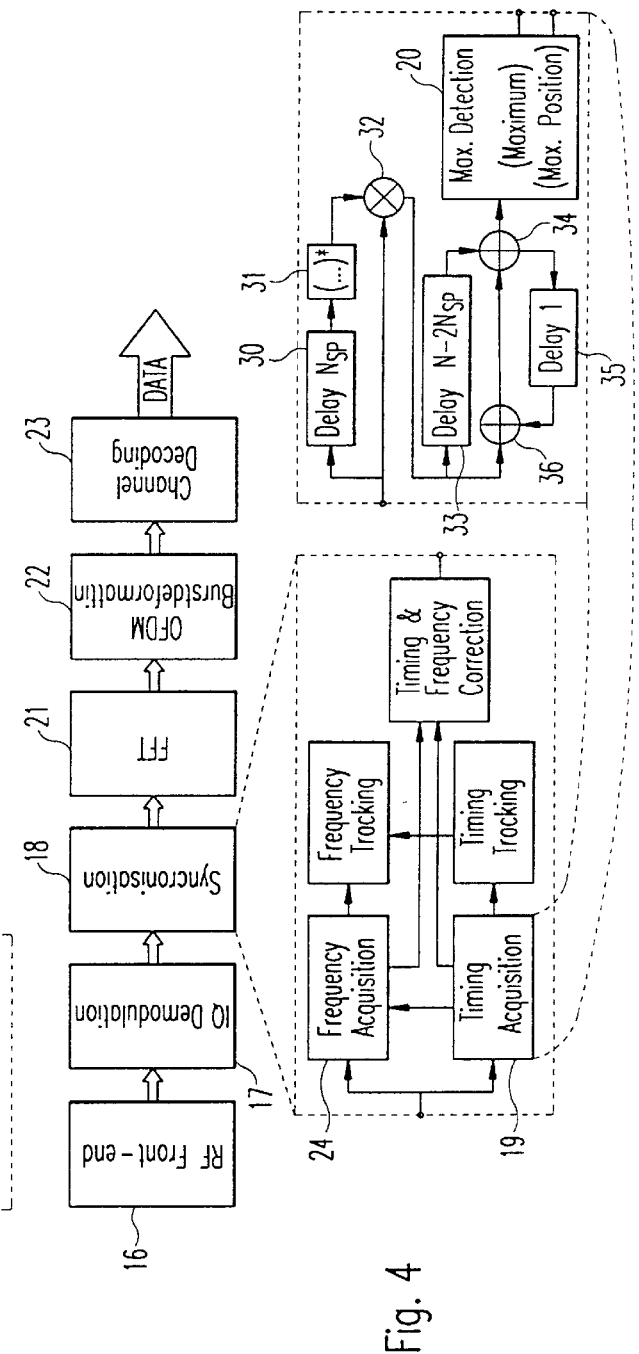
Fig. 3
Fig. 4

(state of the art)

(state of the art)

(state of the art)

(state of the art)

SYNCHRONIZATION OF DIGITAL COMMUNICATION SYSTEMS

The present invention relates generally to the synchronisation of digital communication systems.

Digital communication systems generally need a synchronisation of a transmitting side with a receiving side, i.e. a synchronisation of the timing and the frequency. For example the symbol timing of a FFT-unit has to be synchronised. To achieve said synchronisation it is known to transmit a special training sequence or a reference symbol. This reference symbol usually is embedded into the transmission data structure, as it is shown for example in FIG. 5. FIG. 5 shows the transmission frame, also called the burst structure, of a known technique, wherein a frame consists of F symbols. The reference symbol is inserted in front of a sequence of data symbols. Between the reference symbol and the first data symbol as well as between the following data symbols a so-called guard interval can be inserted in order to avoid inter symbol interference (ISI) in a multipath environment.

On the receiving side a time domain correlation between the received signal containing the reference symbol and a delayed version of the received signal is effected to identify the reference symbol and thus to determine the timing for the synchronisation. For the synchronisation the time of the correlation peak is used which should correspond as accurate as possible to the time of the last sample of the reference symbol. In order to achieve a well detectable correlation peak the reference symbol can consist of a plurality of synchronisation patterns (SP) which are repeated several times in one symbol period.

FIG. 6 shows the time domain structure of the reference symbol of length N which consists of $(N/N_{sp})$ copies of the synchronisation pattern. A very efficient way of generating symbols of the desired structure, e.g. in an OFDM transmission system, is the application of an IFFT (inverse fast Fourier transformation) exploiting the properties of the DFT (Discrete Fourier Transformation) algorithm. Consequently in order to generate a reference symbol of length $T_s$ with $(N/N_{sp})$ synchronization patterns of length $T_s*(N_{sp}/N)$, only every $(N/N_{sp})$-th DFT coefficient (every $(N/N_{sp})$-th subcarrier in frequency domain) has to be modulated.

In FIG. 6 N represents the total number of samples within one reference symbol (and thus the time duration of the reference symbol), $N_{sp}$ represents the number of samples within a single synchronisation pattern, and $N_{guard}$ represents the number of samples of the guard period that may be inserted in order to avoid intersymbol interference (ISI). As can be seen from FIG. 6 the duration of the so-called correlation window is $N+N_{guard}-N_{sp}$.

The time domain correlation which is performed of the incoming data stream can be described mathematically as expressed in the following equation (1):

$$R(i) = \sum_{n=0}^{N+N_{guard}-N_{sp}-1} \underline{y}(i-n) \cdot \underline{y}*(i-n-N_{sp}) \quad (1)$$

As can be seen from equation (1) the received signal is at first multiplied with a complex-conjugated version of itself and then the samples of the correlation window are summed up.

FIG. 7 shows the block diagram of a possible implementation for a time correlation expressed mathematically in equation (1). As can be seen from FIG. 7, the incoming data are mixed (multiplied) with data, which have been delayed 30 by $N_{sp}$ (duration of one synchronisation pattern) and which have been complex-conjugated 31. The mixed data are given on the one hand to an adder 36 and on the other hand to a delay circuit 33 providing for a delay of $(N+N_{guard}-N_{sp})$. The output from the delay circuit 33 is subtracted 34 from the output of the adder 36. The output of the subtraction circuit 34 is delayed 35 by one unit and then set back to the adder 36.

The received signal is therefore correlated to a (by the duration of a synchronisation pattern) delayed version of itself. The correlation result is summed in a certain time window (correlation window) with the duration of $N+N_{guard}-N_{sp}$. The output R(i) of the subtraction circuit 34 is given to a non shown maximum detection circuit detecting the maximum of $|R(i)|$. Thus the time position of the last sample of the received reference symbol can be determined. This timing information can then be used for the symbol timing of the receiver.

However, this known correlation system suffers from some disadvantages. R(i) takes its maximum value if i is the last sample of the received reference symbol. In the absence of noise, frequency offset and multipath propagation, R(i) becomes to $$R(i) = \sum_{n=0}^{N+N_{guard}-N_{sp}-1} |\underline{y}(i-n)|^2 \quad (2)$$

if i is the position of the last sample of the reference symbol.

In that case the sum of equation (1) is a fully constructive superposition of its addends, thus resulting in a peak of $|R(i)|$ at this position. The detection of this peak allows to determine the correct symbol timing of the receiver. The maximum detection of the correlation result R(i) is performed only for synchronisation symbols in this case. The decision whether the current symbol is a reference symbol is based on a pre-set correlation threshold. If $|R(i)|$ exceeds this threshold, the maximum detection is enabled for the period of time which is at least as large as the reference symbol itself $(N+N_{guard})$ to ensure that the maximum peak lies inside the surveyed detection period.

From T. Keller, L. Hanzo, "Orthogonal frequency division multiplex synchronisation techniques for wireless local area networks", PIMCR '96, Taipei, Taiwan, Oct. 15–18, 1996, pages 963–967. Said document describes a range of frequency aquisition, frequency tracking, symbol synchronisation and frame synchronisation techniques. This document is herewith incorporated by reference.

However, in real conditions (noise, multipath reception) the precision of the described symbol timing recovery is decreased.

However, the known algorithm is not very precise even under ideal conditions. FIG. 8 shows the different phases during a correlation process according to the prior art which have to be considered when the correlation window "slides" over the received signal. In phase 1 the correlation window moves into the reference symbol and the correlation result is increasing until it reaches the pre-set detection threshold $R_x$. If $|R(i)|$ exceeds the threshold the result is monitored for the period of the maximum detection window. If the correlation window covers the samples of the entire reference symbol, which is the case in phase 2, the correlation peak will be reached, as all addends of the sum will give a fully constructive contribution to the correlation calculation as set out in equation (1). The time position of this peak value is then used to correct the timing offset of the receiving side. Although the peak has already been reached, the correlation result is monitored until the end of the maximum detection window (phase 3) in order to ensure the peak being globally inside the maximum detection window. Taking account of said three phases, equation (1) can also be expressed as follows:

$$R(i) = \underbrace{\sum_{m=0}^{Z_1} r(i-m) \cdot r*(i-m-N_{sp})}_{A} +$$

$$\underbrace{\sum_{m=Z_1+1}^{Z_2} r(i-m) \cdot r*(i-m-N_{sp})}_{B} + \underbrace{\sum_{m=Z_2+1}^{N+N_G-N_{sp}-1} r(i-m) \cdot r*(i-m-N_{sp})}_{C}$$

As can be seen from equation (3), there are three different contributions to the correlation sum, wherein the different contributions depend on which samples are correlated with each other. In the addend A samples of the synchronisation pattern are correlated, whereas in part B and C either samples from the synchronisation pattern SP or data samples are correlated with data samples. However, only the contribution of part A is deterministic constructive, while the contribution of the parts B and C is respectively random-like. This random-like contribution can be constructive or destructive to the correlation result, depending on the data samples included in the correlation window. As can be seen from FIG. 8 and equation (3), only in phase 2 (correlation peak detection) no random-like contribution is made to the correlation sum result. As the correlation window moves to phase 3, data samples are included in the correlation sum result, which can result in a possible offset of the correlation peak. This possible offset of the correlation peak is caused by the random structure of the data symbols which are transmitted adjacent to the reference symbol in each frame or burst as it is shown in FIG. 8. The correlation peak is offset in time, if the first time samples of the data symbol that is received directly after a reference symbol or the last time samples of the data symbol that is received immediately before a reference symbol cause a constructive contribution to the correlation sum in equation (1). In that case a timing estimation error is introduced into the system which is likely to degrade the bit error rate (BER). In case the first time samples of the data symbol immediately following a received reference symbol cause a constructive contribution, the maximum correlation peak will be displaced to the right in FIG. 8. In case the last data samples of the data symbol immediately preceding the received reference symbol cause a constructive contribution, the maximum correlation peak will be displaced to the left in FIG. 8.

Therefore, the known synchronisation algorithm suffers from the drawback that even without taking account of noise and multipath effects the timing of the last sample of the reference symbol to be determined by the maximum correlation peak can not be detected precisely in all situations.

Therefore, it is the object of the present invention to provide an advanced synchronisation for digital communication systems providing for a more precise synchronisation.

To overcome the drawback of the known timing acquisition method as described above, according to the central aspect of the present invention the random-like correlation between reference and data symbols and thus the random-like constructive contribution of data symbols has to be avoided. According to the invention this objective can be achieved by introducing a deterministic and unique differentiation between the reference and data symbols. Therefore, the reference symbol has to be modified in such a way that a constructive contribution of data samples of adjacent symbols to the correlation sum result is avoided. By avoiding the random influence of adjacent data symbols the synchronisation precision can be enhanced. This results in a significantly improved precision of the timing and the frequency synchronisation.

According to the present invention a method for synchronising digital communication systems is provided, wherein a reference symbol is provided consisting of a sequence of a plurality of synchronisation patterns, wherein the reference symbol is modulated on a RF-frequency. The transmitted reference symbol is correlated with a delayed reference symbol to detect a correlation peak. This peak can be used for timing and frequency synchronisation. According to the present invention at least the last and/or the first of the plurality of synchronisation patterns or a part or a multiple of the last and/or the first of the plurality of synchronisation patterns of said reference symbol is phase shifted before the transmission step.

The reference symbol can be transmitted using OFDM (orthogonal frequency division multiplexing).

Only every $(N/N_{sp})$-th subcarrier must be modulated when the reference symbol is generated, thereby producing the repeated structure of the $(N/N_{sp})$ subsequent synchronisation patterns in the time domain.

The power of the reference symbol can be increased in time domain to compensate for the unmodulated subcarriers.

The result of the correlation can be used to derive the frequency offset.

The reference symbol to be transmitted can be multiplexed with data symbols in the frequency domain. This is advantageous to avoid additional implementation effort for the insertion of the synchronisation symbol in the time domain which is usually larger than in the frequency domain.

A cyclic extension can be inserted between two successive symbols to transmitted thereby avoiding intersymbol interference (ISI).

The phase of at least the last and/or the first synchronisation pattern or a part or a multiple thereof can be shifted e.g. by 180°.

According to the present invention furthermore a digital communication system is provided comprising means for transmitting the reference symbol consisting of the sequence of a plurality of synchronisation patterns and followed by data symbols, wherein the reference symbol is modulated on a RF-frequency. Furthermore, means are provided for correlating the transmitted reference symbol with a delayed reference symbol to detect a correlation peak. According to the present invention said transmitting means comprises means for shifting the phase of at least the last and/or the first of the plurality of synchronisation patterns or a part or a multiple thereof of a reference symbol.

The transmitting means and the receiving means can use a OFDM-system to transmit the reference symbol.

Modulation means can be provided modulating only every $(N/N_{sp})$-th subcarrier when generating the reference symbol.

Adjusting means can be provided increasing the transmission power when transmitting the reference symbol.

Frequency acquisition means can be provided using the result of the correlation to derive a frequency offset of the receiving side of the system.

A multiplexer can be provided inserting the reference symbol in a data symbol stream in the frequency domain.

Means for inserting a cyclic extension between two successive symbols to be transmitted can be provided.

Further features and advantages of the present invention will become clear from the following detailed explanation of an embodiment of the present application taken with the reference to the accompanying drawings.

FIG. 1 shows a reference symbol structure used in the present invention,

FIG. 2 shows phases of the correlation of the reference symbol of FIG. 1,

FIG. 3 shows a transmitter structure according to the present invention,

FIG. 4 shows a receiver structure according to the present invention,

Figure 5:
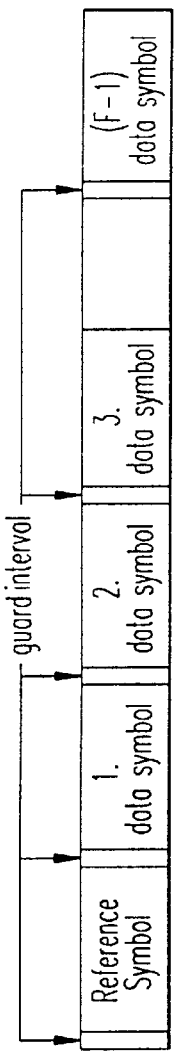
FIG. 5 shows a transmission frame (burst structure) according to the state of the art.
Figure 6:
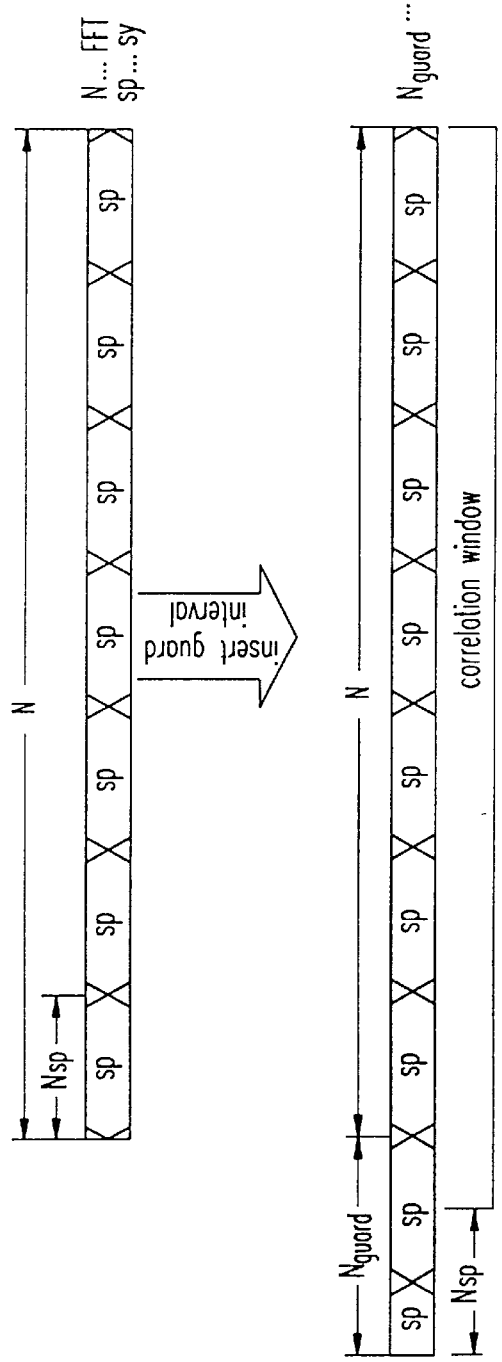
FIG. 6 shows a reference symbol structure in time domain according to the state of the art.

As can be seen from FIG. 1 according to the present invention the reference symbol is modified in such a way that the last synchronization pattern of the reference symbol is phase shifted, e.g. by 180°. As will be clear from the following description, the random contribution of the adjacent data symbols (immediately preceding or following the reference symbol) to the correlation is thus eliminated. taking into account that the guard interval is achieved by a cyclic extension of each symbol by copying the last $N_{guard}$ samples. The black synchronisation pattern in FIG. 1 shows symbolically a synchronisation pattern which phase has been shifted e.g. by 180°.

For the evaluation of the impact of this modified structure again the phases of the correlation process will be considered with the reference to FIG. 2.

As can be seen from FIG. 2 the correlation window according to the present invention is smaller than according to the prior art by the length of the cyclic extension and the phase shifted pattern. By phase shifting some synchronisation patterns, the correlation peak is offset into the reference symbol. This results in a slightly decreased magnitude of the correlation peak. The phase shifting of the last synchronisation pattern of a reference symbol guarantees a deterministic destructive contribution of said synchronisation pattern and thus that the maximum detection peak will not be offset to the right of FIG. 2. When the first synchronisation pattern of the reference symbol is phase inverted or the guard interval is achieved through a cyclic extension like shown in FIG. 2, the deterministic destructive contribution of the first phase shifted synchronisation pattern guarantees that the maximum detection peak will not be displaced to the left-hand side of FIG. 2.

As the correlation window in FIG. 2 moves from phase 2 to phase 3, a new addend will enter the correlation sum calculation and one addend will respectively leave the sum. The new addend is the product of the first sample in the phase shifted synchronisation pattern and the first sample of the previous synchronisation pattern. Therefore, under ideal conditions this product is:

$$P_i = (a_i + jb_i) \cdot (c_i + jd_i) = (a_i + jb_i) \cdot (-a_i - jb_i) = -(a^2 + b^2) \quad (4)$$

In phase 2 the correlation peak is reached. The phase shift of the last synchronisation pattern introduces a deterministic destructive contribution to the correlation sum at the boarder of the correlation window. Under ideal conditions (no noise, no multipath propagation, no frequency offset) the maximum of the correlation sum is thus offset inside the reference symbol by the number of samples which have been phase shifted, e.g. one synchronisation pattern as shown in FIG. 1. By applying the modified structure of the reference symbol the influence of adjacent data symbols on the correlation is entirely eliminated.

In addition the described technique has the advantage that the complex correlation result can directly be used to calculate the frequency offset of the system. If there is a frequency offset present and in absence of noise and multipath propagation the correlation sum result R(i) becomes to $$\underline{R}(i) = \sum_{n=0}^{N-2N_{sp}-1} |\underline{y}(i-n)|^2 \cdot \exp(j\psi_{offset}) \quad (5)$$

if "i" is the position of the peak. From the phase angle of the correlation result in equation (5) the frequency offset can be exactly derived according to equation (6).

$$\psi_{offset} = 2\pi \cdot \frac{f_o}{\Delta f_u} \cdot \frac{N_{sp}}{N} \quad (6)$$

wherein $f_o$ is the frequency offset and $\Delta f_u$ is the subcarrier distance in frequency domain.

Now a transmitting system structure embodying the technique as shown in FIGS. 1 and 2 will be explained with the reference to FIG. 3. FIG. 3 shows the functional block diagram of the proposed transmitting system structure for the advanced timing acquisition. As can be seen from FIG. 3 according to the present invention the data to be transmitted are given to a channel encoder 1. The output of the channel encoder 1 is given to a synchronisation symbol insertion circuit 2. In the synchronisation symbol insertion circuit 2 the reference symbols from a memory 4 are multiplexed by a multiplexer 3 with the data to be transmitted. The output from the synchronisation symbol insertion circuit 2 is given to a OFDM burst mode controller 5. The output from the OFDM burst mode controller 5 is given to an inverse FFT-circuit 6. The output from the inverse FFT-circuit 6 is given to a synchronisation power adjustment circuit 7.

As will be explained in the following in the synchronisation power adjustment circuit 7 the transmitting power is increased when transmitting the reference symbols. The output from the synchronisation power adjustment circuit 7 is given to a synchronisation pattern rotation (inverting) circuit 8. The synchronisation pattern rotation circuit 8 contains a circuit 9 for extracting the last synchronisation pattern of a reference symbol, a phase shifter 10 and a combining circuit 10 combining the phase shifted last synchronisation pattern of a reference symbol with the other synchronisation patterns of the same symbol. The output of the synchronisation pattern rotation circuit 8 is given to a circuit 12 inserting a cyclic extension. Then the data stream containing the data to be transmitted as well as the reference symbols is modulated by a modulator 13 on a RF-frequency. After filtering 14 the data to be transmitted is given to a RF-front-end stage 15. As can be seen from FIG. 3 the synchronisation symbols are inserted in the frequency domain to avoid the generally large implementation effort when inserting in the time domain.

The average power of the synchronisation symbol is lower than the average power of other OFDM-symbols due to the less number of modulated subcarriers. Therefore, a synchronisation power adjustment circuit 7 is provided to increase the transmitting power to match the average power of the OFDM-data symbols. This can be achieved by a multiplication of each sample of the reference symbol with a power adjustment factor which calculates to $$F_{POWER} = \sqrt{\frac{N}{N_{SP}}}$$

After the power adjustment the last synchronisation pattern is rotated by 180°, which is realised through a multiplication by −1 and the synchronisation pattern rotation circuit 8. After the complex signal is converted into a real signal through the IQ-modulator 13, it is passed to the TX-RF-front-end stage 15.

Now the structure of a receiver according to the present invention will be explained with the reference to FIG. 4.

Figure 7:
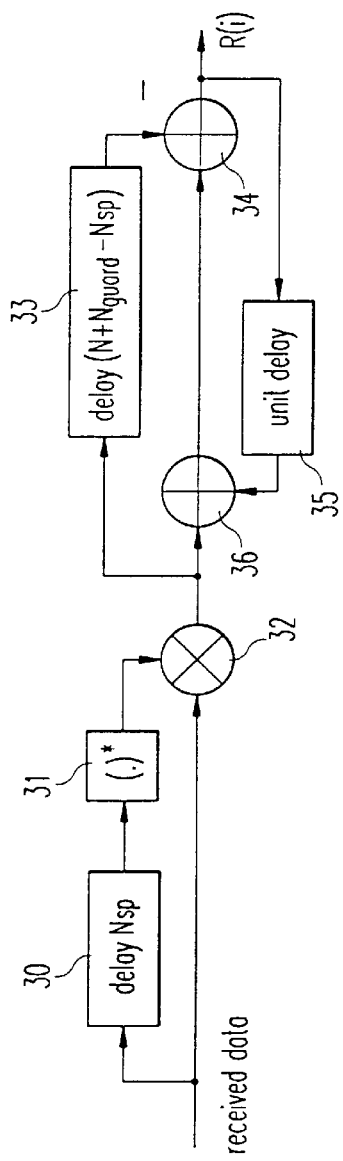
FIG. 7 shows a block diagram for time domain correlation according to the state of the art.
Figure 8:
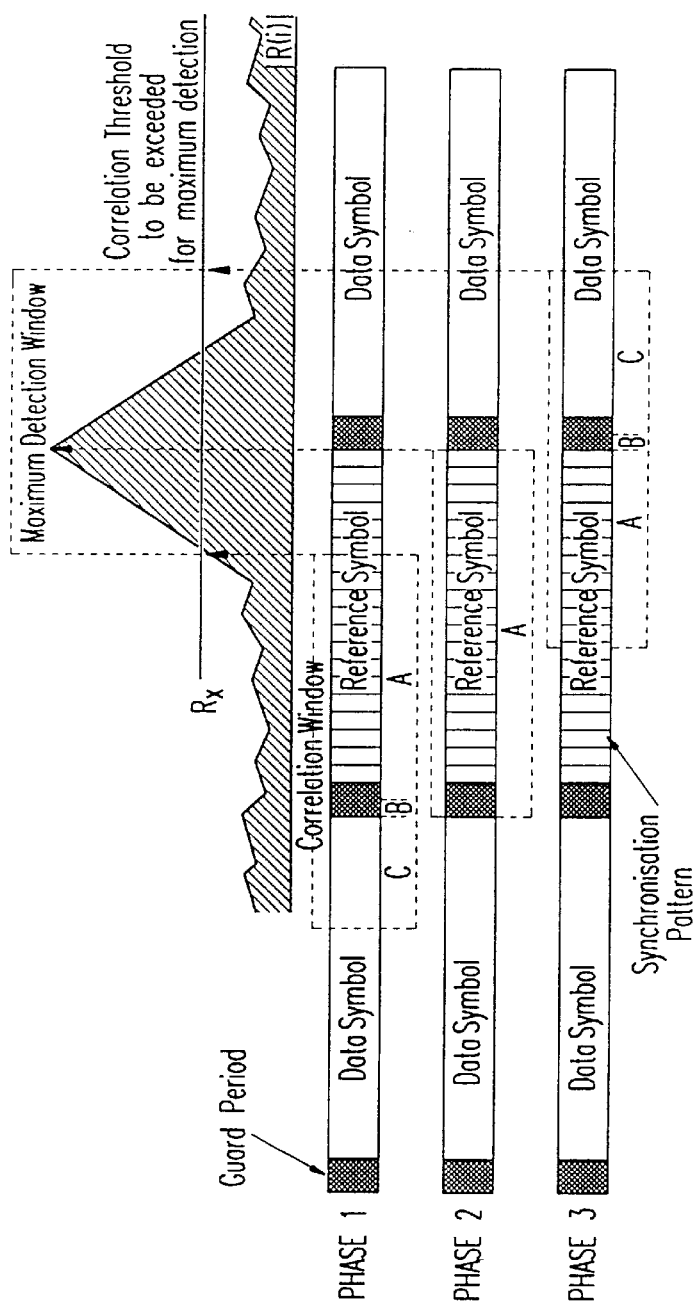
FIG. 8 shows phases of correlation over one reference symbol according to the state of the art.

As can be seen from FIG. 4 the received data from a RF-front-end stage 16 of the receiver are given to an IQ-demodulator 17. The complex output signal from the IQ-demodulator 17 is given to a synchronisation circuit 18. The synchronisation circuit 18 comprises a timing acquisition circuit 19 and, among others, a frequency acquisition circuit 24. As it is shown in FIG. 4 a part of the internal structure from the timing acquisition circuit 19 corresponds to the correlator as it is shown in FIG. 7.

The incoming data are mixed (multiplied) with data, which have been delayed 30 by $N_{sp}$ (duration of one synchronisation pattern) and which have been complex-conjugated 31. The mixed data are given on the one hand to an adder 36 and on the other hand to a delay circuit 33 providing for a delay of $(N-2*N_{sp})$ with respect to the new advanced structure of the reference symbol. The output from the delay circuit 33 is subtracted 34 from the output of the adder 36. The output of the subtraction circuit 34 is delayed 35 by one unit and then set back to the adder 36.

The output from the synchronisation circuit 18 is given to a FFT-circuit 21. The output from the FFT-circuit 21 is given to an OFDM burst deformating circuit 22 and then to a channel decoder 23.

Therefore, as shown in FIG. 4 in the receiver the signal output of the RF-front-end stage 16 is converted into a complex signal to the IQ-demodulator 17. The synchronisation subsystem 18 calculates then the time and frequency offset introduced to the signal and corrects the errors. For the initial synchronisation at the beginning of a frame timing and frequency acquisition algorithms are used, while the tracking algorithm maintains the synchronisation for a frame duration by updating the acquisition results. The precision of the timing acquisition algorithm is significantly improved through the modified structure of the reference symbol according to the present invention. To support this structure a special correlation and maximum detection unit 20 is used. Based on the more precise results of the timing acquisition also the precision of the frequency acquisition can be improved.

The invention therefore entirely eliminates the effects of random contribution of adjacent data symbols to a correlation based synchronisation algorithm. Through the inversion of the last synchronisation pattern and the reference symbol the correlation peak, which is used to determine the symbol timing, is offset inside the reference symbol. The precision of the timing error estimation is thus improved significantly.

The present invention can particularly be applied on OFDM-systems. Technical fields for the application are f.e. high data rate wireless ATM systems, WHN (wireless home network) and WLAN type applications.

What is claimed is:

1. Method for synchronizing digital communication systems, comprising the steps of:
   transmitting a reference symbol consisting of a sequence of a plurality of synchronization patterns, the reference symbol being transmitted using OFDM and being modulated on an RF frequency,
   correlating the transmitted reference symbol with a delayed reference symbol to detect a correlation peak, and
   phase shifting the last and/or the first of the plurality of synchronization patterns of said reference symbol or a part or a multiple thereof before transmitting the reference symbol, such that only every $(N/N_{sp})$-th subcarrier is modulated when generating the reference symbol.

2. Method for synchronizing digital communication systems, comprising the steps of:
   transmitting a reference symbol consisting of a sequence of a plurality of synchronization patterns, the reference symbol being modulated on an RF frequency,
   correlating the transmitted reference symbol with a delayed reference symbol to detect a correlation peak,
   phase shifting the last and/or the first of the plurality of synchronization patterns of said reference symbol or a part or a multiple thereof by a predetermined amount before transmitting the reference symbol, and
   increasing the transmission power when transmitting the reference symbol.

3. Method for synchronizing digital communication systems, comprising the steps of:
   providing a reference symbol consisting of a sequence of a plurality of synchronization patterns, the reference symbol being modulated on an RF frequency,
   correlating the transmitted reference symbol with a delayed reference symbol to detect a correlation peak,
   phase shifting the last and/or the first of the plurality of synchronization patterns of said reference symbol or a part or a multiple thereof before transmitting the reference symbol (RS), and
   inserting a cyclic extension between two successive symbols to be transmitted.

4. Method for synchronizing digital communication systems, comprising the steps of:
   providing a reference symbol consisting of a sequence of a plurality of synchronization patterns, the reference symbol being modulated on an RF frequency,
   correlating the transmitted reference symbol with a delayed reference symbol to detect a correlation peak, and
   phase shifting the last and/or the first of the plurality of synchronization patterns of said reference symbol or a part or a multiple thereof before transmitting the reference symbol,
   wherein the phase of the last and/or the first samples of the reference symbol is shifted by 180°.

5. Digital communications system, comprising:
   means for transmitting a reference symbol consisting of a sequence of a plurality of synchronization patterns, wherein the reference symbol is modulated on an RF frequency,
   means for modulating only every $(N/N_{sp})$-th subcarrier when generating the reference symbol,
   means for correlating the transmitted reference symbol with a delayed reference symbol to detect a correlation peak, and wherein said transmitting means comprises means for shifting the phase of the last and/or the first of the plurality of synchronization patterns of a reference symbol or a part or a multiple thereof.

6. Digital communications system, comprising:

means for transmitting a reference symbol consisting of a sequence of a plurality of synchronization patterns, wherein the reference symbol is modulated on an RF frequency, adjusting means for increasing the transmission power when transmitting the reference symbol, means for correlating the transmitted reference symbol with a delayed reference symbol to detect a correlation peak, and wherein said transmitting means comprises means for shifting the phase of the last and/or the first of the plurality of synchronization patterns of a reference symbol or a part or a multiple thereof by a predetermined amount.

7. Digital communications system, comprising:

means for transmitting a reference symbol consisting of a sequence of a plurality of synchronization patterns, wherein the reference symbol is modulated on an RF frequency, means for correlating the transmitted reference symbol with a delayed reference symbol to detect a correlation peak, frequency acquisition means for using the result of the correlation to derive a frequency offset, and wherein said transmitting means comprises means for shifting the phase of the last and/or the first of the plurality of synchronization patterns of a reference symbol or a part or a multiple thereof by a predetermined amount.

8. Digital communications system, comprising:

means for transmitting a reference symbol consisting of a sequence of a plurality of synchronization patterns, wherein the reference symbol is modulated on an RF frequency, a multiplexer for inserting the reference symbol in the data symbols in the frequency domain, means for correlating the transmitted reference symbol with a delayed reference symbol to detect a correlation peak, and wherein said transmitting means comprises means for shifting the phase of the last and/or the first of the plurality of synchronization patterns of a reference symbol or a part or a multiple thereof by a predetermined amount.

9. Digital communications system, comprising:

means for transmitting a reference symbol consisting of a sequence of a plurality of synchronization patterns, wherein the reference symbol is modulated on an RF frequency, means for inserting a cyclic extension between two successive symbols to be transmitted, means for correlating the transmitted reference symbol with a delayed reference symbol to detect a correlation peak, and wherein said transmitting means comprises means for shifting the phase of the last and/or the first of the plurality of synchronization patterns of a reference symbol or a part or a multiple thereof.

* * * * *

UNITED STATES PATENT AND TRADEMARK OFFICE
CERTIFICATE OF CORRECTION

PATENT NO. : 6,160,821

DATED : December 12, 2000

INVENTOR(S) : Thomas Dölle et al.

It is certified that error appears in the above-identified patent and that said Letters Patent is hereby corrected as shown below:

ON THE TITLE PAGE
Item
[73] Assignee: Should read -- Sony International (Europe) GmbH, Köln-Ossendorf, Germany Signed and Sealed this Twenty-ninth Day of May, 2001

Attest:

NICHOLAS P. GODICI

Attesting Officer

Acting Director of the United States Patent and Trademark Office